United States Patent Office 3,316,146
Patented Apr. 25, 1967

3,316,146
METHOD OF INDUCING SEDATION AND MUSCLE RELAXATION
William J. Wechter, Kalamazoo, Mich., assignor to The Upjohn Company, Kalamazoo, Mich., a corporation of Delaware
No Drawing. Filed Mar. 30, 1964, Ser. No. 355,951
1 Claim. (Cl. 167—52)

This application is a continuation-in-part of application Ser. No. 234,880, filed Nov. 1, 1962, now abandoned.

The present invention relates to a process for therapeutic treatment and more particularly to a process of using compositions comprising 3α-hydroxy-5β-pregnane-11,20-dione 20-cyclic (ethylene acetal), for inducing sedation and muscular relaxation, and inhibiting the glutamic dehydrogenase enzyme system.

The principal active ingredient of the compositions of the present invention is 3α-hydroxy-5β-pregnane-11,20-dione 20-cyclic (ethylene acetal) represented by the formula:

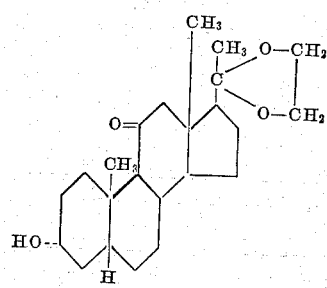

The compound can be prepared by known methods as, for example, described in U.S. Patent 2,824,871.

The compositions of the present invention are presented for oral administration to animals in solid and liquid unit dosage forms, such as tablets, capsules, powders, granules, syrups, elixirs, and the like, containing suitable quantities of 3α-hydroxy-5β-pregnane-11,20-dione 20-cyclic (ethylene acetal).

Powders are quite simply prepared by comminuting the 3α-hydroxy-5β-pregnane-11,20-dione 20-cyclic (ethylene acetal) to a suitably fine size and mixing with a similarly comminuted diluent. The diluent can be an edible carbohydrate material such as starch. Advantageously, a sweetening agent or sugar is present as well as flavoring oil.

Granules for reconstitution into a liquid oral preparation are prepared utilizing water-soluble diluents. A powder mixture of finely divided 3α-hydroxy-5β-pregnane-11,20-dione 20-cyclic (ethylene acetal) and a water-soluble diluent such as sucrose, glucose, and the like, is wetted with a binder such as acacia mucilage, gelatin solution, methylcellulose solution and forced through a screen to form granules which are allowed to dry. Advantageously, a suspending agent such as tragacanth is included in the composition.

Capsules are made by preparing a powder mixture as hereinbefore described and filling into formed gelatin sheaths. Advantageously, as an adjuvant to the filling operation, a lubricant such as talc, magnesium stearate and calcium stearate is added to the powder mixture before the filling operation.

Tablets are made by preparing a powder mixture, granulating or slugging, adding a lubricant and pressing into tablets. The powder mixture is prepared by mixing the 3α-hydroxy-5β-pregnane-11,20-dione 20-cyclic (ethylene acetal), suitably comminuted, with a diluent or base such as starch, sucrose, kaolin, dicalcium phosphate and the like. The powder mixture can be granulated by wetting with a binder such as syrup, starch paste or acacia mucilage and forcing through a screen. As an alternative to granulating, the powder mixture can be slugged, i.e., run through the tablet machine and the resulting imperfectly formed tablets broken into pieces (slugs). The slugs can be lubricated to prevent sticking to the tablet forming dies by means of the addition of stearic acid, a stearate salt, talc or mineral oil. The lubricating mixture is then compressed into tablets.

Advantageously the tablet can be provided with a protective coating consisting of a sealing coat of shellac, a coating of sugar and methylcellulose, and a polish coating of carnauba wax.

Oral fluids are prepared in unit dosage forms such as syrups and elixirs wherein each teaspoonful of composition contains a predetermined amount of 3α-hydroxy-5β-pregnane-11,20-dione 20-cyclic (ethylene acetal) for administration.

A syrup is prepared by suspending the 3α-hydroxy-5β-pregnane-11,20-dione 20-cyclic (ethylene acetal) in a suitably flavored aqueous sucrose solution. Similarly, an elixir is prepared utilizing a hydro-alcoholic vehicle. Elixirs are advantageous vehicles for use when a solution of the 3α-hydroxy-5β-pregnane-11,20-dione 20-cyclic (ethylene acetal) is desired.

For parenteral administration, aqueous and oleaginous fluid unit dosage forms can be prepared. In preparing the parenteral form, a measured amount of 3α-hydroxy-5β-pregnane-11,20-dione 20-cyclic (ethylene acetal) is placed in a vial, the vial and its contents sterilized and sealed. An accompanying vial of sterile water is provided as a vehicle to form a suspension prior to administration. Advantageously the sterile water can have dissolved therein a local anesthetic and buffering agent.

Alternatively, a parenteral solution can be prepared by dissolving 3α-hydroxy-5β-pregnane-11,20-dione 20-cyclic (ethylene acetal) in benzyl benzoate, and then mixing with a parenterally acceptable oil.

In addition to oral and parenteral administration, the rectal route can be utilized. The 3α-hydroxy-5β-pregnane-11,20-dione 20-cyclic (ethylene acetal) can be administered by means of a suppository. A vehicle which has a melting point at about body temperature or one that is readily miscible can be utilized. For example, cocoa butter and various polyethylene glycols can serve as the vehicle. Advantageously, a buffer is included in the solid and liquid compositions to aid in preventing the hydrolysis of the acetal. Alkaline buffers such as calcium carbonate, sodium bicarbonate, and the like can be used in the manner known in the art to provide an alkaline environment.

For the treatment of domestic birds and mammals by oral administration, the 3α-hydroxy 5β-pregnane-11,20-dione 20-cyclic (ethylene acetal) is conveniently prepared in the form of a food premix. The food premix can comprise the 3α-hydroxy-5β-pregnane-11,20-dione 20-cyclic (ethylene acetal) in admixture with an edible pharmaceutical diluent of the type previously mentioned such as starch, oatmeal, flour, calcium carbonate, talc, dried fish meal and the like non-toxic, orally acceptable pharmaceutical diluents. The prepared premix is then conveniently added to the regular feed, thereby providing medication to the mammal or bird in the course of feeding.

The term unit dosage form as used in the specification and claims refers to physically discrete units suitable as unitary dosages for animals, each unit containing a predetermined quantity of active material calculated to produce the desired therapeutic effect in association with the required pharmaceutical diluent, carrier or vehicle. The specification for the novel unit dosage forms of this invention are directly dependent on (a) the unique characteristics of the active material and the particular theraeutic effect to be achieved, and (b) the limitations inherent in the art of compounding such an active material for therapeutic use in animals, as disclosed in detail in this specification, these being features of the present invention. Examples of suitable unit dosage forms in accord with this invention are tablets, capsules, suppositories, powder packets, granules, pills, teaspoonfuls, segregated multiples of any of the foregoing, and other forms as herein described.

The amount of a compound of 3α-hydroxy-5β-pregnane-11,20-dione 20-cyclic (ethylene acetal) that is to be administered depends on the species, age, weight, subject, and the particular condition to be treated. A dose of from about 1 to about 10 mg./kg. of body weight can be administered.

In addition to the administration of 3α-hydroxy-5β-pregnane-11,20-dione 20-cyclic (ethylene acetal) as the principal active ingredient of compositions for the treatment of conditions described herein, the 3α-hydroxy-5β pregnane-11,20-dione 20-cyclic (ethylene acetal) can be included with other types of compounds to obtain advantageous combinations of properties. Such combinations include 3α-hydroxy-5β-pregnane-11,20-dione 20-cyclic (ethylene acetal) in combination with barbiturates such as barbital, phenobarbital, mephobarbital, amobarbital, secobarbital, and hexobarbital and the like; and anticonvulsants such as glutamic acid, diphenylhydantoin, amino-glutethimide, paramethadione, phenacemide, phenylacetylurea, phensuxamide, primidone and trimethadione.

3α-hydroxy-5β-pregnane-11,20-dione 20-cyclic (ethylene acetal) is an orally and parenterally active steroid, i.e., it is systemically absorbed when administered orally and parenterally, having muscle relaxant and sedative-hypnotic properties. The compound is essentially devoid of hormonal effects. The central nervous system depressant properties are exemplified by depression of motor activity and potentiation of hexobarbital-induced sleep. Small doses produce muscle-relaxant effects with moderate depression whereas larger doses produce a progressive depression leading to deep hypnosis.

The administration of the compositions of the present invention provides the veterinarian with a method for inducing muscle relaxation and sedation or hypnosis in animals.

Additionally the compositions provide useful tools to the pharmacologist by supplying a means for blocking the action of the glutamic dehydrogenase enzyme system in the brain of experimental animals. Similarly the enzyme system can be blocked in in vitro systems.

The following examples illustrate the best mode contemplated by the inventor for carrying out the invention but are not to be construed as limiting the scope thereof.

*Example 1*

1000 two-piece hard gelatin capsules for oral use, each containing 100 mg. of 3α-hydroxy-5β-pregnane-11,20-dione 20-cyclic (ethylene acetal), are prepared from the following types and amounts of ingredients:

|  | Gm. |
|---|---|
| 3α-hydroxy-5β-pregnane-11,20-dione 20-cyclic (ethylene acetal) | 100 |
| Calcium carbonate | 100 |
| Magnesium stearate | 75 |
| Light liquid petrolatum | 25 |

The ingredients are mixed together thoroughly and capsulated in the usual manner.

Following the procedure of the foregoing example, capsules are prepared containing 500 mg. of 3α-hydroxy-5β-pregnane-11,20-dione 20-cyclic (ethylene acetal) by substituting 500 gm. of the said compound for the 100 gm. of the example.

*Example 2*

One thousand tablets for oral administration, each containing 100 mg. of 3α-hydroxy-5β-pregnane-11,20-dione 20-cyclic (ethylene acetal), are prepared from the following types and amounts of ingredients:

|  | Gm. |
|---|---|
| 3α-hydroxy-5β-pregnane-11,20-dione 20-cyclic (ethylene acetal) | 100 |
| Calcium carbonate | 100 |
| Cornstarch | 65 |
| Magnesium stearate | 15 |

The ingredients are thoroughly mixed and slugged. The slugs are broken down by forcing through a screen. The resulting granules are then compressed into tablets, each tablet containing 100 mg. of 3α-hydroxy-5β-pregnane-11,20-dione 20-cyclic (ethylene acetal).

Following the foregoing procedure, tablets are prepared containing 3α - hydroxy - 5β - pregnane-11,20-dione 20-cyclic (ethylene acetal) in 25 mg., 50 mg. and 75 mg. amounts by substituting 25, 50 and 75 gm. amounts of 3α-hydroxy-5β-pregnane-11,20-dione 20-cyclic (ethylene acetal) for the 100 gm. amount of the example.

*Example 3*

1000 cc. of an elixir is prepared from the following types and amounts of ingredients:

| 3α - hydroxy - 5β - pregnane - 11,20 - dione 20 - cyclic (ethylene acetal) | gm | 20 |
|---|---|---|
| Sweet orange peel tincture | ml | 20 |
| Sodium citrate | gm | 4 |
| Benzaldehyde | ml | .05 |
| Glycerin | ml | 400 |
| Ethanol, 95% | ml | 430 |
| Simple syrup | ml | 100 |
| Distilled water, q.s. 1000 ml. | | |

Dissolve the acetal in the alcohol; add successively the tincture, sodium citrate, the benzaldehyde, the glycerin, the syrup and sufficient water to make the product measure 1000 ml.

Each teaspoonful (5 cc.) provides 100 mg. of 3α-hydroxy-5β-pregnane-11,20-dione 20-cyclic (ethylene acetal).

*Example 4*

A sterile parenteral solution for intramuscular use, containing 25 mg. of 3α-hydroxy-5β-pregnane-11,20-dione 20-cyclic (ethylene acetal) in 1 cc., is prepared from the following types and amounts of ingredients:

| 3α - hydroxy - 5β - pregnane - 11,20 - dione 20-cyclic (ethylene acetal) | gm | 25 |
|---|---|---|
| Benzyl benzoate | cc | 500 |
| Ethanolamine | cc | 10 |
| Cottonseed oil, q.s. 1000 cc. | | |

The 3α - hydroxy - 5β - pregnane - 11,20-dione 20-cyclic (ethylene acetal) and ethanolamine are dissolved in the benzyl benzoate and sufficient cottonseed oil added to make 1000 cc. The solution is sterilized and filled into 2 cc. ampoules.

*Example 5*

A sterile aqueous suspension for intramuscular use, containing in 1 cc. 100 mg. of 3α-hydroxy-5β-pregnane-11,20-dione 20-cyclic (ethylene acetal) is prepared from the following types and amounts of materials:

|  | Gm. |
|---|---|
| 3α - hydroxy - 5β - pregnane - 11,20 - dione 20-cyclic (ethylene acetal) | 100 |
| Sodium citrate | 4 |
| Sodium carboxymethylcellulose, low viscosity | 7.5 |
| Polyvinylpyrrolidone | 7.5 |
| Polysorbate 80 | 4 |
| Methylparaben | 2.5 |
| Propylparaben | 0.17 |
| Water for injection, q.s. 1000 ml. | |

The sodium carboxymethylcellulose, sodium citrate, polyvinylpyrrolidone and polysorbate 80 are dispersed in sufficient water and sterilized by autoclaving at 120° C. for 30 minutes. The finely powdered 3α-hydroxy-5β-pregnane-11,20-dione 20-cyclic (ethylene acetal), methylparaben and propylparaben are sterilized separately by treatment with ethylene oxide, then mixed well in a suitable sterile blender and finally dispersed in the cooled, autoclaved vehicle. The finished sterile suspension is packaged aseptically in sterile vials.

*Example 6*

1000 gm. of feed mix is prepared from the following types and amounts of ingredients:

| | Gm. |
|---|---|
| 3α-hydroxy-5β-pregnane-11,20-dione 20-cyclic (ethylene acetal) | 20 |
| Soybean meal | 400 |
| Fish meal | 400 |
| Wheat germ oil | 50 |
| Sorghum molasses | 130 |

The ingredients are mixed together and pressed into pellets.

For large animals the composition can be added to the amounts of regular feed in an amount calculated to give the desired dose.

*Example 7.—Inhibition of glutamic dehydrogenase*

A. *Control.*—A 10% homogenate prepared from the livers of freshly killed rats homogenized in a blender with distilled water at about 0° C. serves as the enzyme source. A 0.2 ml. aliquot of the homogenate is added to chilled Warburg flasks containing 0.9 ml. of 0.066 M phosphate buffer (pH 7.2), 0.3 ml. of 2.2% diphosphopyridine nucleatide (NAD or coenzyme I), 0.6 ml. of 0.5 M glutamic acid, 0.2 ml. of $2 \times 10^{-4}$ M cytochrome C, 0.2 ml. of 1.0 M semicarbazide (adjusted to pH 7.2) and cold distilled water to make final volume of 3.0 ml.

B. *Blank.*—The Blank is prepared in like manner as the control omitting the liver homogenate.

C. 1128 mcg. of 3α-hydroxy-5β-pregnane-11,20-dione, 20-cyclic (ethylene acetal) is added to a control system (replacing an equivalent volume of water) to provide a system with $10^{-3}$ M concentration of steroid.

D. By means of a Warburg apparatus with a center well containing 0.2 ml. of 2 M potassium hydroxide, air as the gas phase, 38° C. temp. and shaking rate of 112 cycles/minute, the oxygen uptake of the controls is measured, and compared to the oxygen uptake of the system containing the steroid. The blank corrects for variation in laboratory conditions. The oxygen uptake over a 40 minute period is calculated from the burette readings of the Warburg apparatus.

The following results were obtained:

| Minute | Blank | Control | Control | Steroid | Steroid |
|---|---|---|---|---|---|
| 0 | 150 | 150 | 150 | 150 | 150 |
| 10 | 156 | 117 | 115 | 145 | 144 |
| 20 | 159 | 90 | 93 | 141 | 142 |
| 30 | 163 | 67 | 70 | 139 | 140 |
| 40 | 168 | 51 | 55 | 138 | 137 |
| Wet $Q_{O_2}$ (calc.) Av. | | 19.2 / 19.4 | 19.5 | 5.1 / 4.8 | 4.5 |

3α-hydroxy-5β-pregnane-11,20-dione 20-cyclic (ethylene acetal) at a concentration of $10^{-3}$ M provided 75% inhibition of the enzyme system.

What is claimed is:

A process for inducing sedation and muscular relaxation comprising the administration to an animal of an effective amount of 3α-hydroxy-5β-pregnane-11,20-dione 20-cyclic (ethylene acetal) in combination with a pharmaceutical carrier.

References Cited by the Examiner

UNITED STATES PATENTS 2,824,871  2/1958  Levin _____ 260—239.55

ALBERT T. MEYERS, *Primary Examiner.*

JULIAN S. LEVITT, *Examiner.*

MARTIN J. COHEN, STANLEY J. FRIEDMAN,
*Assistant Examiners.*